July 31, 1962  O. SCHARPF  3,047,233
DIRECT AND REVERSE ACTING TEMPERATURE REGULATING APPARATUS
Filed Sept. 26, 1960  2 Sheets-Sheet 1
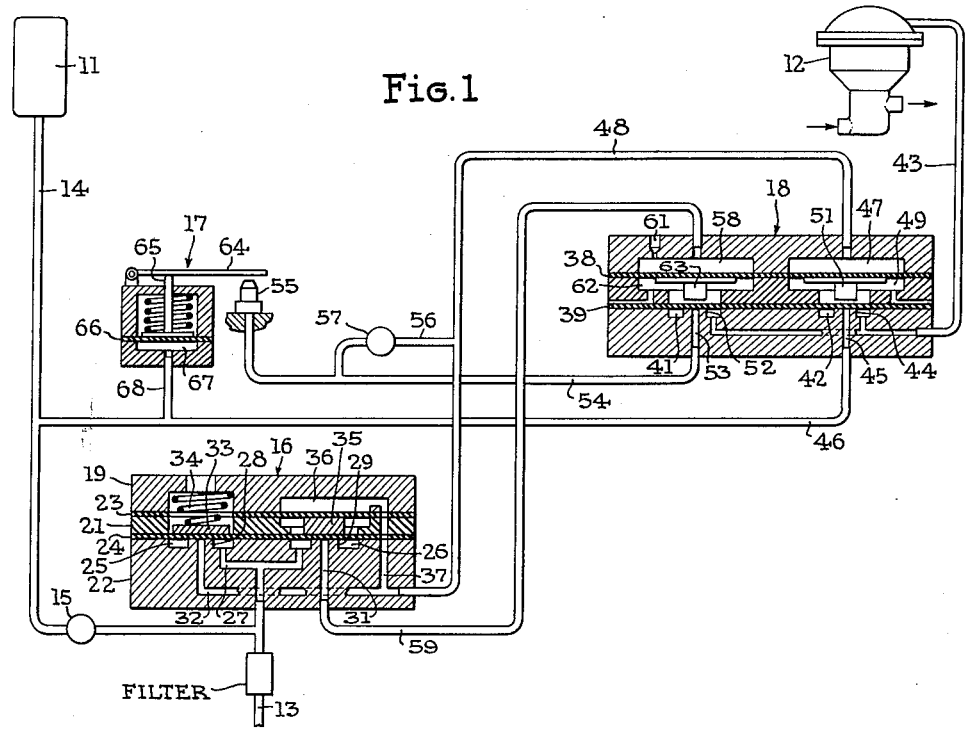
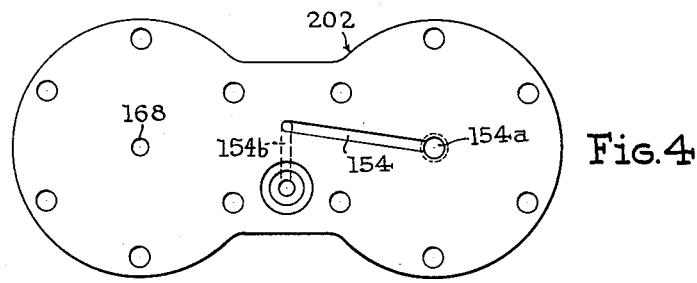
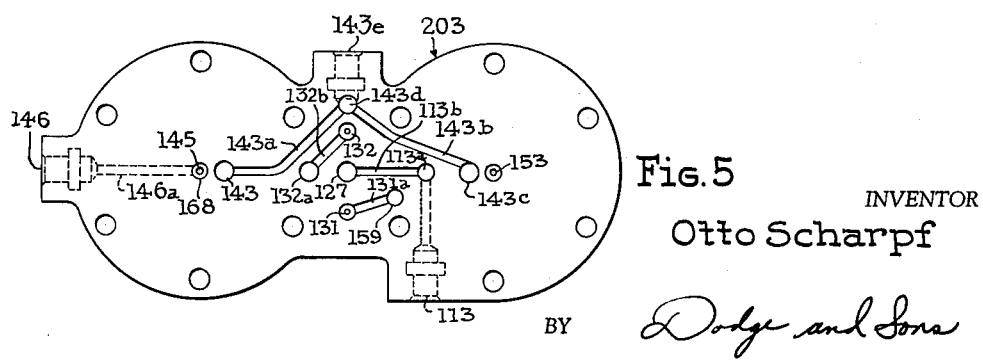
INVENTOR
Otto Scharpf
BY Dodge and Sons
ATTORNEYS July 31, 1962     O. SCHARPF     3,047,233
DIRECT AND REVERSE ACTING TEMPERATURE REGULATING APPARATUS
Filed Sept. 26, 1960     2 Sheets-Sheet 2
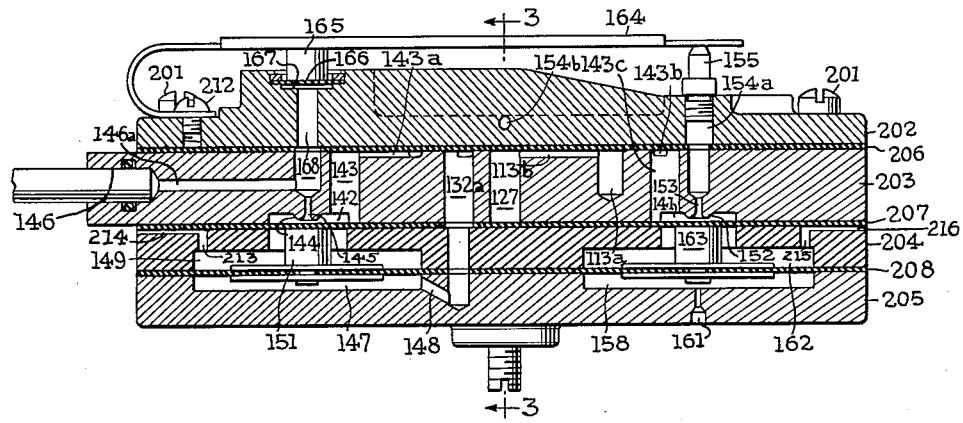
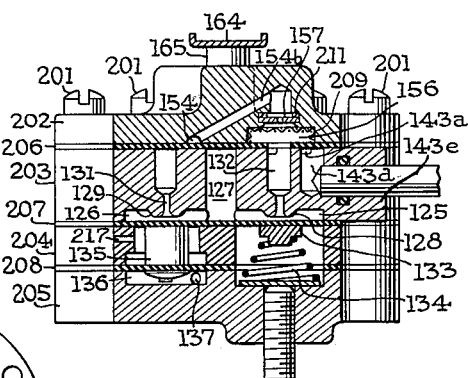
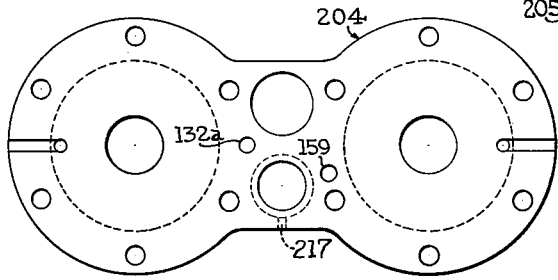
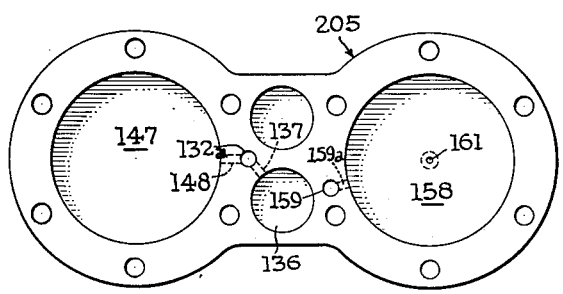
INVENTOR
Otto Scharpf
BY *Dodge and Sons*
ATTORNEYS United States Patent Office 3,047,233
Patented July 31, 1962

3,047,233
DIRECT AND REVERSE ACTING TEMPERATURE REGULATING APPARATUS
Otto Scharpf, Milwaukee, Wis., assignor to Johnson Service Company, Milwaukee, Wis., a corporation of Wisconsin
Filed Sept. 26, 1960, Ser. No. 58,446
6 Claims. (Cl. 236—1)

This invention relates to heating and cooling control mechanisms. Particularly it relates to a pneumatic mechanism suited to use in low cost heating and cooling systems.

It is commonplace today to provide air conditioning units in the individual rooms of a building which consist of little more than a finned heat exchange coil, a fan to circulate room air in heat-exchange relationship therewith, and a valve in the supply to said heat exchanger to control the rate of flow of heat exchange medium. Operation of the valve commonly is controlled by a pneumatic thermostat which, because of the fact that the heat exchange medium is a hot fluid in winter and a cold fluid in summer, must be capable of closing the valve in response to a rise in temperature during the winter and of opening the valve in response to the same change in temperature during the summer. It is desirable that the switch from winter to summer control operation and vice versa be effected simply by changing the pressure of the air supplied from a central station and without the need for manual readjustment of the individual units in the various rooms.

The object of this invention is to provide a control mechanism which automatically performs this switching function and yet is sufficiently inexpensive to make attractive its use in low-cost room units of the type described.

The mechanism of this invention is used with a single pneumatic thermostat, that supplies to its branch line a pressure which varies with temperature, and functions, in response to changes in supply pressure, to either connect the controlled valve directly with this branch line or to transmit to that valve a control pressure which varies inversely with the branch line pressure. This mechanism is, in its preferred form, a one-piece assembly which embodies a sandwich construction of die cast parts in which drilled passages are kept to an absolute minimum. The several valves used in the mechanism are, in every instance, of the diaphragm type and each diaphragm also serves as a sealing gasket between the individual rigid parts of the sandwich.

The preferred embodiment of the invention will now be described in detail with reference to the accompanying drawings in which:

FIG. 1 is a simplified schematic diagram of a control system embodying the present invention.

FIG. 2 is an axial sectional view of the one-piece assembly, which includes the switch 16, the flapper valve assembly 17, the relay 18, and the restrictor 57 of FIG. 1.

FIG. 3 is a sectional view taken on line 3—3 of FIG. 2.

FIG. 4 is a bottom plan view of the top plate 202 of the one-piece assembly.

FIG. 5 is a top plan view of the intermediate plate 203 of the one-piece assembly.

FIG. 6 is a top plan view of the other intermediate plate 204 of the one-piece assembly.

FIG. 7 is a top plan view of the bottom plate 205 of the one-piece assembly.

As shown in FIG. 1, the control mechanism is associated with a thermostat 11 which is arranged to control a fluid pressure operated valve 12 that modulates the rate of flow of heating and cooling media to a heat exchanger (not shown), and which receives fluid from a supply line 13 via line 14 and needle valve 15. Thermostat 11 is conventional and includes a bimetallic bar which responds to the temperature in the room and regulates the rate of leakage through a leak port connected with line 14. The bimetallic bar is arranged to move toward the leak port, and thus decrease rate of leakage, as temperature rises and to move in the opposite direction as temperature drops. The valve 12, which also is conventional, is arranged to close in response to a rising control pressure.

The control mechanism includes a fluid switch 16, a leak port-flapper valve assembly 17, and a relay 18. The switch 16, which is disclosed and claimed in Thomas M. Holloway application Serial No. 55,062, filed September 9, 1960, comprises three rigid body plates 19, 21 and 22 which are separated by two rubber-like diaphragms 23 and 24 and which are clamped together by screws (not illustrated). These diaphragms 23 and 24 function as valving members and also as gaskets which seal the mating faces of the body plates. The body plates 19, 21 and 22 have plane faces and in the upper face of the lower plate 22 there are formed two annular grooves 25 and 26 that constitute the inlet ports of the two valve units included within the switch, and which are in continuous communication with a common inlet passage 27. The grooves 25 and 26 define and are coaxial with annular valve seats 28 and 29, respectively, having central outlet ports (not numbered) that are terminal points for the outlet passages 32 and 31, respectively. Those portions of diaphragm 24 overlying grooves 25 and 26 serve as the movable valve elements of the two valving units whose seats just have been described. Attached to diaphragm 24 is a seat disc 33 against which the lower end of tapered coil spring 34 reacts. This spring extends upward through a circular opening formed in and through body plates 19 and 21 and diaphragm 23 and seats on a shoulder formed in body plate 19. A circular thrust transmitter 35 is attached to both of the diaphragms 23 and 24 and is centered with respect to the seat 29. The lower face of body plate 19 is provided with a circular recessed cavity 36 which is coaxial with annular groove 26 but whose diameter is larger than that of the groove. This cavity is connected with the outlet passage 32 by a passage 37.

The relay valve 18 also employs a three-part housing whose flat body plates are separated by rubber-like diaphragms 38 and 39 which, like their counterparts in the switch 16, perform valving as well as sealing functions. Formed in the upper face of the lower body plate are annular grooves 41 and 42 which are in open communication with one another and with the motor chamber of the fluid pressure-operated valve 12 by means of the conduit 43. The groove 42 defines and is coaxial with an annular valve seat 44 which is provided with a central passage 45 that is connected with the line 14 by conduit 46. The portion of diaphragm 39 overlying groove 42 and the valve seat 44 define a valve unit for controlling communication between passages 43 and 45. The lower face of the upper plate of relay 18 is provided with a circular recess or motor chamber 47 which is coaxial with groove 42 and which is connected with the outlet passage 32 of switch 16 by a conduit 48. Between and coaxial with annular groove 42 and motor chamber 47 is a vented chamber 49 formed in the center plate of the relay and containing a thrust transmitter 51 which is attached to the lower surface of diaphragm 38. When the diaphragm 38 is flexed downward by the pressure in the chamber 47, this transmitter 51 contacts and forces diaphragm 39 into sealing engagement with the annular valve seat 44.

At its left side (as viewed in FIG. 1) the relay 18 is provided with a second valve unit including the annular groove 41, seat 52, central passage 53, motor chamber 58, vented chamber 62 and thrust transmitter 63 which are similar to the parts 42, 44, 45, 47, 49 and 51 of the first valve unit. The central passage 53 is connected with a leak port 55 through conduit 54 and with the conduit 48 through passage 56 and needle valve 57. Motor chamber 58 is connected with the outlet passage 31 of switch 16 by a conduit 59 and is provided with a restricted vent 61.

The leak port and flapper valve assembly 17 includes the leak port 55 and a flapper valve 64 which is actuated through a push rod 65 by a flexible diaphragm 66 of the fluid pressure motor 67. This motor 67 receives pressure fluid from conduit 46 through the conduit 68.

In a typical installation, the supply pressures used during the heating and cooling seasons are 15 and 19 p.s.i.g., respectively. During the heating season, the supply air which is transmitted to annular groove 25 of switch 16 is ineffective to move diaphragm 24 away from seat 28 against the bias of spring 34, so outlet passage 32, conduits 48 and 54, passage 56 and motor chamber 47 are isolated from the supply. Because this chamber and these passages and conduits are in communication with leak port 55, they are subject to atmospheric pressure at this time. Supply air also is transmitted to the annular groove 26 of switch 16 and, since diaphragm 24 is held on seat 29 only by the weight of thrust transmitter 35, it is effective there to open the valve unit and establish communication between common inlet passage 27 and outlet passage 31. Therefore, supply air at 15 p.s.i. is conveyed to motor chamber 58 and since the flow capacity of the restricted leak passage 61 is less than the flow capacity of the supply valve unit in switch 16, it develops a super-atmospheric pressure in that chamber. This pressure, acting on the diaphragm and through thrust transmitter 63, holds diaphragm 39 in sealing engagement with seat 52 against the forces developed by atmospheric pressure in control passage 53 and by the control pressure in annular groove 41.

Supply air also is furnished to the thermostat 11, and, because of the restriction afforded by the needle valve 15, the relative positions of the flapper valve and the bleed port in the thermostat establish a variable but lower pressure in the conduits 14 and 46 and 68. Inasmuch as motor chamber 47 is at atmospheric pressure, the variable control pressure transmitted to central passage 45 causes diaphragm 39 to flex upward and open communication between this passage and the conduit 43 leading to the controlled valve 12. Thus it is seen that a direct connection is established between the thermostat 11 and the valve 12. A rising temperature, sensed by the thermostat 11, causes an increase in the control pressure in conduit 43 and thus causes the valve 12 to move toward its closed position and reduce the rate at which the heating medium is supplied to the heat exchanger. A falling temperature causes movement in the opposite direction.

During the cooling season, the supply pressure is raised to 19 p.s.i. The cross-sectional area of annular groove 25, in switch 16, is so correlated with the force exerted by spring 34 that this pressure will overcome the bias of the spring 34 and thus cause diaphragm 24 to move away from seat 28. When this happens, supply fluid is admitted to passage 32, cavity 36, conduit 48, motor chamber 47, passage 56, and conduit 54. Because of the fact that that portion of diaphragm 23 subject to the pressure in cavity 36 has a larger area than the portion of diaphragm 24 overlying annular groove 26, the increased pressure in cavity 36, acting on diaphragm 23 and through thrust transmitter 35, forces diaphragm 24 into sealing engagement with seat 29, thereby terminating the transmission of suply fluid to outlet passage 31, conduit 59, and motor chamber 58. The pressure remaining in these passages at the time of change-over is bled to atmosphere through the restricted vent 61. After the pressure in the motor chamber 58 has been dissipated, the pressure in central passage 53 flexes diaphragm 39 upward thus establishing communication between central passage 53 and annular groove 41. Meanwhile, pressure in motor chamber 47, acting on diaphragm 38 and through thrust transmitter 51, will have moved diaphragm 39 downward into sealing engagement with seat 44, thereby interrupting communication between annular groove 42 and the central passage 45. Thus it will be seen that valve 12 now recives control pressure from the conduit 54.

Fluid is supplied to conduit 54 from conduit 48 through the passage 56 and at a restricted rate determined by needle valve 57. The position of flapper valve 64 relative to leak port 55 determines the rate of flow through the leak port 55 and consequently the pressure in conduit 54. Flapper valve 64 is positioned by motor 67 in accordance with the pressure in conduit 46 developed by thermostat 11. The arrangement of these parts is such that an increase in pressure in the conduits 14 and 46, and hence in the motor 67, causes a reduction in the pressure in conduit 54. Therefore, a rising temperature at the thermostat 11 produces a decrease in the control pressure supplied to the valve 12. As a result, the valve moves toward its open position, to increase the rate of supply of cooling medium to the heat exchanger. A falling temperature produces the opposite effect.

FIGS. 2 through 6 illustrate the preferred embodiment of the control mechanism. This apparatus is a one-piece assembly of sandwich construction and includes the fluid switch 16, the flapper valve-leak port assembly 17, the relay valve 18, and the counterpart of the needle valve 57. The assembly comprises rigid body plates separated by rubber-like diaphragms and, where possible, the chambers and passages in the plates are located in the surfaces or extend into the plates in directions normal to these faces. In this way all of the chambers and most of the passages can be formed by cores during the die casting operation and drilled passages are kept to a minimum. Those parts of the one-piece assembly which have counterparts in the FIG. 1 schematic bear numbers that are higher by one-hundred than the numbers on the counterparts. For clarity, certain portions of some of the flow passages are identified by letters a, b, c, etc. added to the basic reference numeral. Furthermore, those passages which extend in directions normal to the faces of the plates are called normal passages.

As shown in FIGS. 2 and 3, the one-piece assembly employs four die cast flat body plates 202, 203, 204 and 205 whose adjacent faces are plane surfaces and which are separated by three rubber-like diaphragms 206, 207 and 208. These seven parts are clamped together by a plurality of cap screws 201 which pass through holes in the plates 202, 203 and 204 and the diaphragms 206, 207 and 208 and are threaded into tapped holes in the lower plate 205. The fluid switch portion of the one-piece assembly (see FIG. 3) includes two annular grooves 125 and 126 that are formed in the lower face of plate 203 and which are coaxial with and define the annular valve seats 128 and 129, respectively. The edges of the seats are rounded to provide for line contact with diaphragm 207. Three parallel normal passages 127, 131 and 132 extend through plate 203 and constitute, respectively, the common inlet passage and the two outlet passages of the switch. Passages 131 and 132 are centered in the annular seats 129 and 128, respectively, and the passage 127 communicates with the two annular grooves 125 and 126. That portion of diaphragm 207 underlying annular groove 125 carries a spring seat 133 that is centered relatively to valve seat 128 and supports the upper end of tapered coil spring 134. The lower end of spring 134 is seated on a plate supported by a screw which is threaded in a normal bore formed in plate 205. The two diaphragms 207 and 208 carry a cylindrical thrust transmitter 135 that is positioned i na normal stepped bore formed through plate 204 in alignment with the seat 129. Directly below and aligned with the thrust transmitter 135 is a circular cavity 136 formed in the upper surface of the lower body plate 205. This cavity is connected with the outlet passage 132 through a flow path comprising a drilled passage 137 (FIG. 7), a normal bore 132a (FIG. 2) which extends upward through plates 204 and 203 and diaphragms 208 and 207, and a groove 132b (FIG. 5) formed in the upper surface of body plate 203 and sealed by the lower face of diaphragm 206.

Air is supplied to the common inlet passage 127 of the switch portion of the one-piece assembly from an inlet port 113 (FIG. 5) drilled in the side of body plate 203 in a direction parallel with its plane faces. The interconnecting flow path comprises a normal portion 113a (FIGS. 2 and 5) which extends upward through plate 203, and a groove 113b formed in the upper face of that plate and sealed by the lower face of diaphrgam 206. The outlet passages 131 and 132 of the switch are connected with the motor chambers 158 and 147, respectively, of the relay portion of the one-piece assembly; the flow path to motor chamber 147 including the groove 132b and normal passage 132a, already mentioned, and the drilled passage 148, and the flow path to motor chamber 158 including a groove 131a (FIG. 5) formed in the upper surface of plate 203 and sealed by the under side of diaphragm 206, the normal passage 159 which extends downward through plates 203 and 204 and diaphragms 207 and 208 into plate 205, and a drilled passage 159a (FIG. 7). The two motor chambers 147 and 158 are formed as circular recesses in the upper face of plate 205 and the chamber 158 is provided with a restricted normal vent passage 161.

Directly above chamber 147 (as viewed in FIG. 2) is a coaxial normal stepped circular opening 149 extending through plate 204 and a coaxial annular grove 142 formed in the lower surface of body plate 203. Opening 149 is vented to atmosphere through normal passage 213 and groove 214 formed in the upper face of plate 204. The groove 142 defines an annular valve seat 144 that is aligned with the motor chamber 147 and, together with diaphragm 207, forms one valve unit of the relay. A thrust transmitter 151 is fastened to the upper side of diaphragm 208 and is arranged to flex diaphragm 207 upward into engagement with its seat 144. A similar stepped opening 162, annular groove 141, seat 152 and thrust transmitter 163 are aligned with and lie directly above motor chamber 158 and these parts make up the second valve unit of the relay. As in the case of the switch, the edges of seats 144 and 152 are rounded to provide for line contact with diaphragm 207. Opening 162 is vented to atmosphere through normal passage 215 and groove 216 formed in the upper face of plate 204. The annular grooves 141 and 142 are in communication with a pair of normal passages 143c and 143 (see FIG. 2) which are interconnected by the grooves 143a and 143b (FIG. 5) formed in the upper surface of body plate 203. At their junction the grooves 143a and 143b are intersected by a normal passage 143d (FIGS. 3 and 5) which leads downward into the drilled controlled pressure port 143e (see FIG. 3) extending into plate 203 in a direction parallel with its plane faces. In use, this port 143e is connected with the control valve which regulates the flow of heat exchange medium.

Extending upward through body plate 203 and diaphragm 206 is a normal passage 153 (FIG. 2) which is centered with respect to seat 152 and which, at its upper end, merges into normal passage 154a leading to leak port 155. Formed in the lower surface of the upper body plate 202 is a groove 154 that extends between normal passage 154a and the lower end of a drilled passage 154b. Passage 154b is connected with the upper end of a normal passage 156 (FIG. 3) which is formed in body plate 202 and diaphragm 206 as an extension of the outlet passage 132 of the switch. Mounted in passage 156 is an orifice plate 157 which is staked in place against an annular gasket 211 and positioned just above a cup-shaped filter element 209.

The rate of leakage through leak port 155 is controlled by a flapper valve 164 which is attached to upper body plate 202 by screws 212 and which is, in essence, a leaf spring. The flapper valve 164 is actuated by the diaphragm 166 that is backed by an annular gasket and staked in place in the upper end 167 of a normal passage 168 formed in plate 202. Diaphragm 166 carries a thrust transmitter 165 which is the actuating link between it and the flapper valve 164. Passage 168 is formed in plates 202 and 203 and in diaphragm 206 as an extension of the normal passage 145 which is centered on seat 144 of one of the valve units of the relay. A drilled passage 146a connects the passage 168 with a port 146 (see FIG. 2) to which the output pressure of thermostat 11 is applied.

An inspection of FIGS. 2 through 7 will show that, except for the ports 113, 143e and 146 in plate 203, the only drilled passages employed in the preferred form of the controlled mechanism are those numbered 137, 148 and 159a in FIG. 7, 146a in FIG. 2, and 154b and 217 in FIG. 3. Size and sealing limitations make necessary the use of ports of the type shown and this, in turn, requires the presence of a drilled passage 146a. Passages 137 and 148 cannot be formed as grooves in the upper face of plate 205 because the pressure in passage 132a would be able to force diaphragm 208 downward into those grooves and escape to atmosphere through either the vented chamber surrounding thrust transmitter 135 or the vented chamber 149. Similar considerations make impossible the substitution of surface grooves for the drilled passages 159a and 217. Passage 154b is drilled because it must intersect passage 156 on the side of orifice plate 157 opposite groove 132b. It is thus seen that this design utilizes the maximum number of cored passages and consequently affords minimum cost.

The operation of the mechanism shown in FIGS. 2 through 6 is identical to the schematically illustrated apparatus of FIG. 1. During the heating season, supply air at low pressure (say 15 p.s.i.) is admitted to the connection 113. This fluid is delivered through passages 113a, 113b and 127 to the supply chambers 125 and 126 of the switch. Supply air at 15 p.s.i. will not overcome the bias of the spring 134 and hence, pressure fluid will not be admitted to the passages 132, 132a, 132b, 137, 148, 154, 154a and 154b. Therefore, at this time, cavity 136 and chamber 147 are at atmospheric pressure. Supply fluid, however, is transmitted from the passage 127 through passage 131, groove 131a in the upper face of plate 203, normal passage 159 and drilled passage 159a to the motor chamber 158. This fluid is supplied to the chamber 158 at a rate greater than the leakage rate afforded by restricted vent 161 and, therefore, pressure builds up in this motor chamber and causes diaphragm 208 and thrust transmitter 163 to move diaphragm 207 into sealing engagement with seat 152 and close passage 153.

The output pressure of the thermostat 11, which enters the port 146 of the one-piece assembly, passes through passage 145, the annular valve groove 142, passage 143, groove 143a, and the normal passage 143d to the control pressure outlet port 143e. Thus it will be seen that under heating conditions, the thermostat 11 is connected directly with the motor-operated valve 12.

During the cooling season, supply air is delivered at a higher pressure (say 19 p.s.i.) to the inlet port 113. The higher pressure which now is present in the supply groove 125 of the switch, overcomes the bias of the spring 134 and moves diaphragm 207 away from the annular seat 128, permitting the passages 132, 132a, 132b, 137, 148, 154, 154a and 154b, chamber 147 and cavity 136 to be charged with fluid under pressure. Since the effective area of diaphragm 208 subject to the pressure in cavity 136 is greater than the effective area of diaphragm 207 subject to the pressure in groove 126, the development of pressure in cavity 136 causes the diaphragm 207 to engage the annular valve seat 129 and isolate passage 131 from the supply groove 126. The pressure in passages 131, 131a, 159 and 159a and in chamber 158 bleeds to atmosphere through restricted vent 161. After the pressure in motor chamber 158 is dissipated, the fluid in passage 153 (see FIG. 2) of the relay is effective to flex diaphragms 207 and 208 downward and open communication between passage 153 and groove 141. This action establishes a flow path from the inlet groove 125 of the switch to the controlled pressure outlet 143e comprising passages 132 and 156, orifice plate 157, passage 154b, groove 154, passages 154a and 153, annular groove 141, passages 143c, groove 143b and passage 143d. The pressure in this path depends on the position of flapper valve 164 relative to leak port 155 which, in turn, depends upon the output pressure of thermostat 11, which is acting on diaphragm 166. Since the leakage flow from leak port 155 increases as the output pressure of thermostat 11 increases, the control pressure supplied to the valve 12 varies inversely with the temperature sensed by the thermostat.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. In combination, a supply passage; a flow restriction in the supply passage, a thermostat including a leak port connected with the supply passage and temperature responsive means for varying the rate of leakage through the leak port; a branch line connected with the supply passage between the leak port of the thermostat and the flow restriction; a fluid pressure motor operated valve for regulating the flow of a heat exchange medium in accordance with the pressure transmitted thereto; and control mechanism connected with and responsive to the pressure in the supply passage for connecting the motor operated valve directly with the branch line when supply pressure is one value and, when supply pressure is another value for transmitting to the motor operated valve a control pressure which varies inversely with the pressure in the branch line.

2. The combination defined in claim 1 in which the control mechanism comprises a fluid switch having an inlet passage connected with the supply passage, two outlet passages, and valve means responsive to supply pressure and serving to connect the inlet passage with the first outlet passage when supply pressure is below a certain value and to connect the inlet passage with the second outlet passage when supply pressure exceeds said certain value; a leak port; valve means operable in response to the pressure in the branch line and serving to regulate the rate of leakage through the leak port in direct relation to the pressure in the branch line; a pair of relay valve units, each having an outlet passage connected with the motor operated valve, an inlet passage and a valve element movable in opening and closing directions for controlling communication between the inlet and outlet passage, the inlet passage of the first relay valve unit being connected with the branch line and the inlet passage of the second relay valve unit being connected with the leak port; a restricted passage connecting the second outlet passage of the switch with the leak port; a restricted vent passage connected with the first outlet passage of the switch; first and second pressure responsive means operatively connected with the movable valve elements of the first and second relay valve units, respectively, for urging those elements in the closing direction, the first pressure responsive means being subject to the pressure in the second outlet passage of the switch and the second pressure responsive means being subject to the pressure in the first outlet passage of the switch; and third and fourth pressure responsive means operatively connected with the movable elements of the first and second relay valve units, respectively, for urging those elements in the opening direction, the third and fourth pressure responsive means being subject to the pressures in the inlet passages of the first and second relay valve units, respectively.

3. A control mechanism comprising four stacked body plates whose adjacent faces are plane surfaces, there being an upper plate, a lower plate and upper and lower intermediate plates; three rubber-like diaphragms interposed between adjacent body plates; means clamping the body plates and diaphragms together to form a one-piece sandwich assembly; first and second spaced annular grooves formed in the lower face of the upper intermediate body plate and defining first and second valve seats, respectively; first and second openings extending through the lower intermediate body plate in alignment with the first and second annular grooves, respectively; a first recess formed in the upper face of the lower body plate in alignment with the first opening through the lower intermediate body plate; a first thrust transmitter centered in the first opening in the lower intermediate body plate and reacting between the two diaphragms on opposite sides of this body plate; a third opening formed through the diaphragm underlying the lower intermediate body plate in alignment with the second opening in that body plate; a spring seat centered in the second opening in the lower intermediate body plate and attached to the diaphragm which overlies that body plate; a spring located in the second and third openings and reacting between the seat and the lower body plate; third and fourth spaced annular grooves formed in the lower surface of the upper intermediate body plate and defining third and fourth valve seats, respectively; fourth and fifth openings formed through the lower intermediate body plate in alignment with the third and fourth annular grooves, respectively; second and third recesses formed in the upper face of the lower body plate in alignment with the fourth and fifth openings, respectively; second and third thrust transmitters centered in the fourth and fifth openings, respectively, and reacting between the two diaphragms on opposite sides of the lower intermediate body plate; a leak port carried by the upper body plate; a flapper valve mounted on the upper body plate and arranged to move toward and away from the leak port; a fluid pressure motor carried by the upper body plate in operative engagement with the flapper valve; first, second, third and fourth valve ports centered in the first, second, third and fourth seats, respectively; a supply port opening into the upper intermediate body plate; a first passage connecting the supply port with the first and second annular grooves; a second passage connecting the first valve port with the third recess in the lower body plate; a third passage connecting the second valve port with the second recess in the lower body plate; a first restricted passage connecting the second valve port with the leak port; a branch line port extending into the upper intermediate body plate; a fourth passage connecting the branch port with the fluid pressure motor; a fifth passage connecting the branch line port with the third valve port; a sixth passage connecting the fourth valve port with the leak port; a restricted vent passage connected with the third recess in the lower body plate; an outlet port extending into the upper intermediate body plate; a seventh passage connecting the outlet port with the third annular groove; an eighth passage connecting the outlet port with the fourth annular groove; and a ninth passage connecting the second valve port with the first recess in the lower body plate.

4. The mechanism defined in claim 3 in which the first passage comprises a first portion formed wholly within the upper intermediate body plate and extending inward from the supply port, a second portion which extends upward from the first portion through the upper surface of the upper intermediate body plate, a third portion which is defined by a groove in the upper face of the upper intermediate body plate, and a fourth portion which extends downward through the upper intermediate body plate and intersects the first and second annular grooves; in which the second passage comprises a first portion which extends upward from the first valve port through the upper surface of the upper intermediate body plate, a second portion which is defined by a groove in the upper surface of the upper intermediate plate, a third portion which extends downward through the upper and lower intermediate body plates and through the diaphragms on opposite sides of the lower intermediate body plate into the lower body plate, and a fourth portion formed wholly within the lower body plate and extending between the third recess and the third portion; in which the third passage comprises a first portion which extends upward from the second valve port through the upper surface of the upper intermediate body plate, a second portion which is defined by a groove formed in the upper surface of the upper intermediate body plate, a third portion which extends downward through the upper and lower intermediate body plates and through the diaphragms on opposite sides of the lower intermediate body plate into the lower body plate, and a fourth portion formed wholly within the lower body plate and extending between the second recess and the third portion; in which the first restricted passage comprises the first portion of the third passage, a second portion which extends upward through the diaphragm underlying the upper body plate, a third restricted portion which extends upward into the upper body plate, a fourth portion which extends downward through the lower surface of the upper plate, a fifth portion which is defined by a groove formed in the lower surface of the upper plate, and a sixth portion which extends upward through the upper plate to the leak port; in which the fourth passage comprises a first portion formed wholly within the upper intermediate body plate and extending inward from the branch line port, and a second portion which extends upward through the upper surface of the upper intermediate body plate and through the diaphragm overlying this body plate and into the upper body plate; in which the fifth passage comprises the first portion of the fourth passage and a second portion which extends downward through the upper intermediate body plate to the third valve port; in which the sixth passage comprises a first portion which extends upward from the fourth valve port through the upper surface of the upper intermediate body plate and through the diaphragm overlying that plate, and a second portion which is the sixth portion of the first restricted passage; in which the restricted vent passage extends downward from the third recess through the lower surface of the lower body plate; in which the seventh passage comprises a first portion from wholly within the upper intermediate body plate and extending inward from the outlet port, a second portion which extends upward through the upper surface of the upper intermediate body plate, a third portion which is defined by a groove formed in the upper surface of the upper intermediate body plate, and a fourth portion which extends downward through the upper intermediate plate and intersects the third annular groove; in which the eighth passage comprises the first and second portions of the seventh passage, a third portion which is defined by a groove formed in the upper face of the upper intermediate body plate, and a fourth portion which extends downward through the upper intermediate plate and intersects the fourth annular groove; and in which the ninth passage comprises the first, second and third portions of the third passage, and a fourth portion formed wholly within the lower body plate and extending between the third portion and the first recess.

5. The mechanism defined in claim 4 in which the restricted vent passage and the following portions of the other passages extend in directions normal to the plane faces of the body plates: the second and fourth portions of the first passage, the first and third portions of the second passage, the first and third portions of the third passage, the second, third and sixth portions of the first restricted passage, the second portion of the fourth passage, the second portion of the fifth passage, the first portion of the sixth passage, the second and fourth portions of the seventh passage, and the fourth portion of the eighth passage.

6. The mechanism defined in claim 5 in which the fourth and fifth openings are stepped so that their lower portions are large than their upper portions; and including tenth and eleventh passages for venting the fourth and fifth openings, each passage comprising a first portion formed in the lower intermediate body plate and extending upward through the upper surface of that plate from the enlarged portion of the openings in a direction normal to the plane faces, and a second portion which is defined by a groove formed in the upper face of the lower intermediate body plate and opening through the side face of that plate; and a twelfth passage formed wholly within the lower intermediate body plate for venting the first opening.

References Cited in the file of this patent
UNITED STATES PATENTS

| | | |
|---|---|---|
| 2,021,263 | Otto | Nov. 19, 1935 |
| 2,120,507 | Otto | June 14, 1938 |
| 2,272,025 | Scharpf | Feb. 3, 1942 |
| 2,285,513 | Harris | June 9, 1942 |